(12) United States Patent
Tsunoda

(10) Patent No.: US 9,524,433 B2
(45) Date of Patent: Dec. 20, 2016

(54) INFORMATION PROCESSING APPARATUS AND INFORMATION PROCESSING METHOD

(71) Applicant: TOSHIBA TEC KABUSHIKI KAISHA, Shinagawa-ku, Tokyo (JP)

(72) Inventor: Youji Tsunoda, Izunokuni (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 190 days.

(21) Appl. No.: 14/332,787

(22) Filed: Jul. 16, 2014

(65) Prior Publication Data

US 2015/0023565 A1    Jan. 22, 2015

(30) Foreign Application Priority Data

Jul. 16, 2013  (JP) .................. 2013-147938

(51) Int. Cl.
G06K 9/00 (2006.01)
G06K 9/03 (2006.01)

(52) U.S. Cl.
CPC ....... *G06K 9/00536* (2013.01); *G06K 9/00523* (2013.01); *G06K 9/033* (2013.01); *G06K 2209/15* (2013.01)

(58) Field of Classification Search
None
See application file for complete search history.

(56) References Cited

U.S. PATENT DOCUMENTS

| 6,990,473 B1* | 1/2006 | Yabuki | G06Q 10/087 705/14.38 |
| 2002/0143672 A1* | 10/2002 | Sawasaki | G06Q 10/0875 705/29 |
| 2012/0018515 A1* | 1/2012 | Kakino | G06K 7/1465 235/454 |
| 2013/0057692 A1 | 3/2013 | Naito et al. | |
| 2013/0101168 A1 | 4/2013 | Naito et al. | |

FOREIGN PATENT DOCUMENTS

| EP | 1223536 | 7/2002 |
| JP | 2004-310670 | 11/2004 |
| JP | 2013-054666 | 3/2013 |
| JP | 2013-089085 | 5/2013 |

OTHER PUBLICATIONS

Office Action of Notice of Rejection for Japanese Patent Application No. 2013-147938 dated May 12, 2015, 12 pages.

* cited by examiner

*Primary Examiner* — Shefali Goradia
(74) *Attorney, Agent, or Firm* — Amin, Turocy & Watson LLP; Gregory Turocy

(57) ABSTRACT

In accordance with one embodiment, an information processing apparatus comprises an image capturing module configured to photograph a commodity to capture the image of the commodity, an acquisition module configured to acquire the image captured by the image capturing module, a recognition module configured to recognize a commodity as a candidate of the commodity from standard commodities based on the image of the commodity captured by the image capturing module, a clock module configured to count an elapsed time until the recognition module recognizes the commodity, and a notification module configured to give a notification if the elapsed time reaches a given time.

5 Claims, 10 Drawing Sheets

FIG.3
| COMMODITY ID | COMMODITY CATEGORY | COMMODITY NAME | UNIT PRICE | COMMODITY IMAGE | FEATURE AMOUNT |
|---|---|---|---|---|---|
| XXXXXXX1 | X | A | $ 0.7 |  | ... |
| XXXXXXX2 | X | B | $ 2.0 |  | ... |
| XXXXXXX3 | X | C | $ 0.9 |  | ... |
| XXXXXXX4 | X | D | $ 1.0 |  | ... |
| ... | ... | ... | ... | ... | ... |
| XXXXX101 | Y | L | $ 2.0 |  | ... |
| ... | ... | ... | ... | ... | ... |
F1

INFORMATION PROCESSING APPARATUS AND INFORMATION PROCESSING METHOD

CROSS-REFERENCE TO RELATED APPLICATION

This application is based upon and claims the benefit of priority from Japanese Patent Application No. 2013-147938, filed Jul. 16, 2013, the entire contents of which are incorporated herein by reference.

FIELD

Embodiments described herein relate to an information processing apparatus and an information processing method.

BACKGROUND

Conventionally, there is a technology in which the feature amount of an object is extracted from image data obtained by photographing the object and the extracted feature amount is compared with the prepared data indicating the feature amount of an object for comparison to recognize the category of the object. Moreover, a store system in which such technology is applied to the recognition of a commodity such as vegetables and fruits and the sales of the recognized commodity is registered is proposed. In such a store system, the comparison between the feature amount of the commodity obtained from the image data and the data of the commodity for comparison is carried out continuously while the commodity is photographed. Then, the commodity for comparison corresponding to the data in which the similarity degree between the commodity for comparison and the commodity photographed is greater than a given threshold value is recognized as a candidate of the commodity.

However, in a conventional store system, for example, the comparison between the commodity and the data is carried out continuously even in a case in which there is no commodity for comparison corresponding to the commodity photographed. In this case, because a user is not aware of the inexistence of the data of the commodity for comparison corresponding to the commodity photographed, there is a possibility that the user continues the photographing operation of the commodity, which may deteriorate efficiency of the processing.

BRIEF DESCRIPTION OF THE DRAWINGS

FIG. 3 is a diagram schematically illustrating one example of data arrangement of a PLU file shown in FIG. 2;

DETAILED DESCRIPTION

In accordance with one embodiment, an information processing apparatus comprises an image capturing module, an acquisition module, a recognition module, a clock module and a notification module. The image capturing module photographs a commodity to capture the image of the commodity. The acquisition module acquires the image captured by the image capturing module. The recognition module recognizes a commodity as a candidate of the commodity from standard commodities based on the image of the commodity acquired by the acquisition module. The clock module counts an elapsed time until the recognition module recognizes the commodity. The notification module gives a notification if the elapsed time reaches a given time.

Hereinafter, taking a checkout system as an example, an information processing apparatus and program according to the present embodiment are described with reference to the accompanying drawings. A store system is a checkout system (POS system) comprising a POS terminal for registering and settling commodities in one transaction. The present embodiment is an example of application to a checkout system introduced to a store such as a supermarket and the like.

Figure 1:
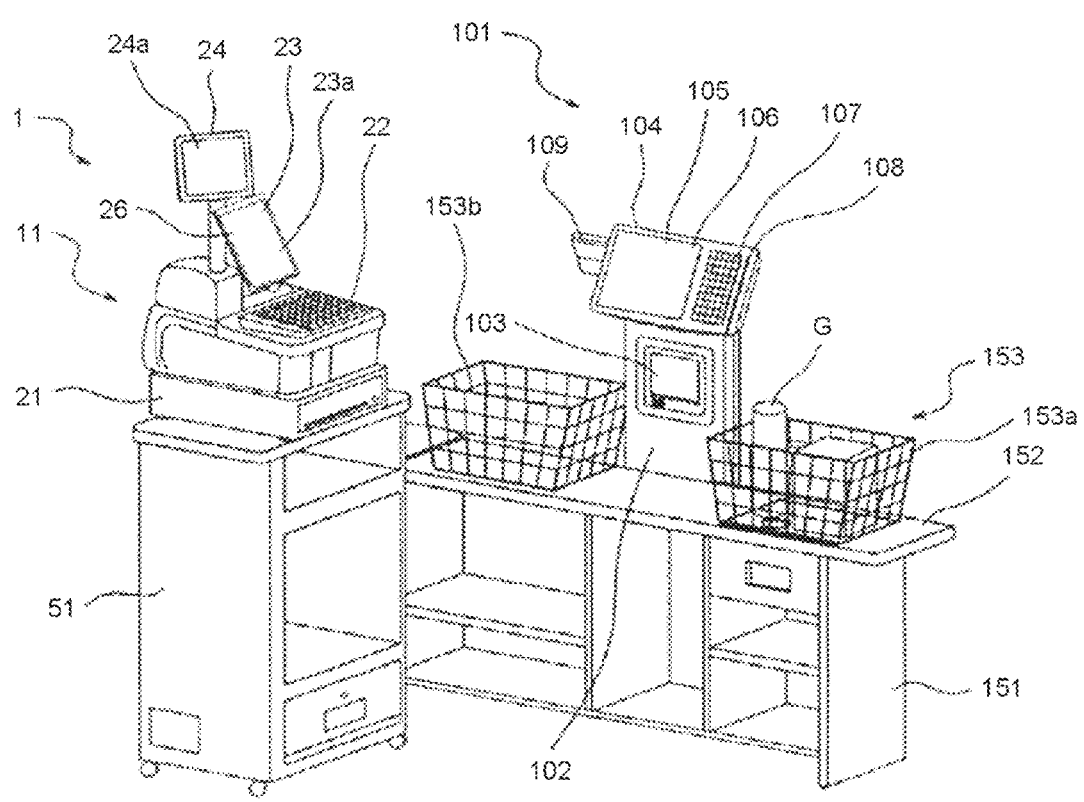
FIG. 1 is a perspective view illustrating an external constitution of a checkout system according to an embodiment.

FIG. 1 is a perspective view illustrating an external constitution of a checkout system 1. As shown in FIG. 1, the checkout system 1 comprises a POS terminal 11 and a commodity reading apparatus 101 serving as an information processing apparatus.

The POS terminal 11 is placed on a drawer 21 on a checkout counter 51. The drawer 21 is opened or closed under the control of the POS terminal 11. A keyboard 22 is arranged on the upper surface of the POS terminal 11 for an operator (shop clerk) who operates the POS terminal 11. A display device 23 for displaying information to the operator is arranged at a position opposite to the operator with respect to the keyboard 22. The display device 23 displays information on a display screen 23a thereof. A touch panel 26 is laminated on the display screen 23a. A display for customer 24 is vertically arranged to be rotatable at a backside to the display device 23. The display for customer 24 displays information on a display screen 24a thereof.

The display for customer 24 shown in FIG. 1 is in a state in which the display screen 24a thereof faces the operator in FIG. 1, however, the display for customer 24 can be rotated such that the display screen 24a is directed to a customer to display information to the customer.

A horizontally elongated counter table 151 is arranged to be in an L-shape with the checkout counter 51 on which the POS terminal 11 is placed. A commodity receiving surface 152 is formed on the counter table 151. Shopping basket 153 which receives a commodity G therein is placed on the commodity receiving surface 152. It can be understood to classify the shopping basket 153 on the counter table 151 into a first shopping basket 153a brought to the counter table 151 by a customer and a second shopping basket 153b placed facing the first shopping basket 153a across the commodity reading apparatus 101.

The commodity reading apparatus 101, which is connected with the POS terminal 11 to be capable of sending and receiving data, is arranged on the commodity receiving surface 152 of the counter table 151. The commodity reading apparatus 101 comprises a thin rectangular housing 102.

A reading window 103 is arranged at the front side of the housing 102. A display and operation section 104 is installed on the upper portion of the housing 102. A display device 106 such as a liquid crystal display device on the surface of which a touch panel 105 is laminated is arranged on the display and operation section 104. A keyboard 107 is arranged at the right side of the display device 106. A card reading slot 108 of a card reader (not shown) is arranged at the right side of the keyboard 107. A display for customer 109 for providing information for a customer is arranged at the left side of the display and operation section 104.

Commodities G purchased in one transaction are put in the first shopping basket 153a and are brought to the counter table 151 by a customer. The commodities G in the first shopping basket 153a are moved one by one to the second shopping basket 153b by the operator who operates the commodity reading apparatus 101. During the movement, the commodity G is directed to the reading window 103 of the commodity reading apparatus 101. At this time, an image capturing section 164 (referring to FIG. 2) arranged in the reading window 103 captures an image of the commodity G.

Figure 2:
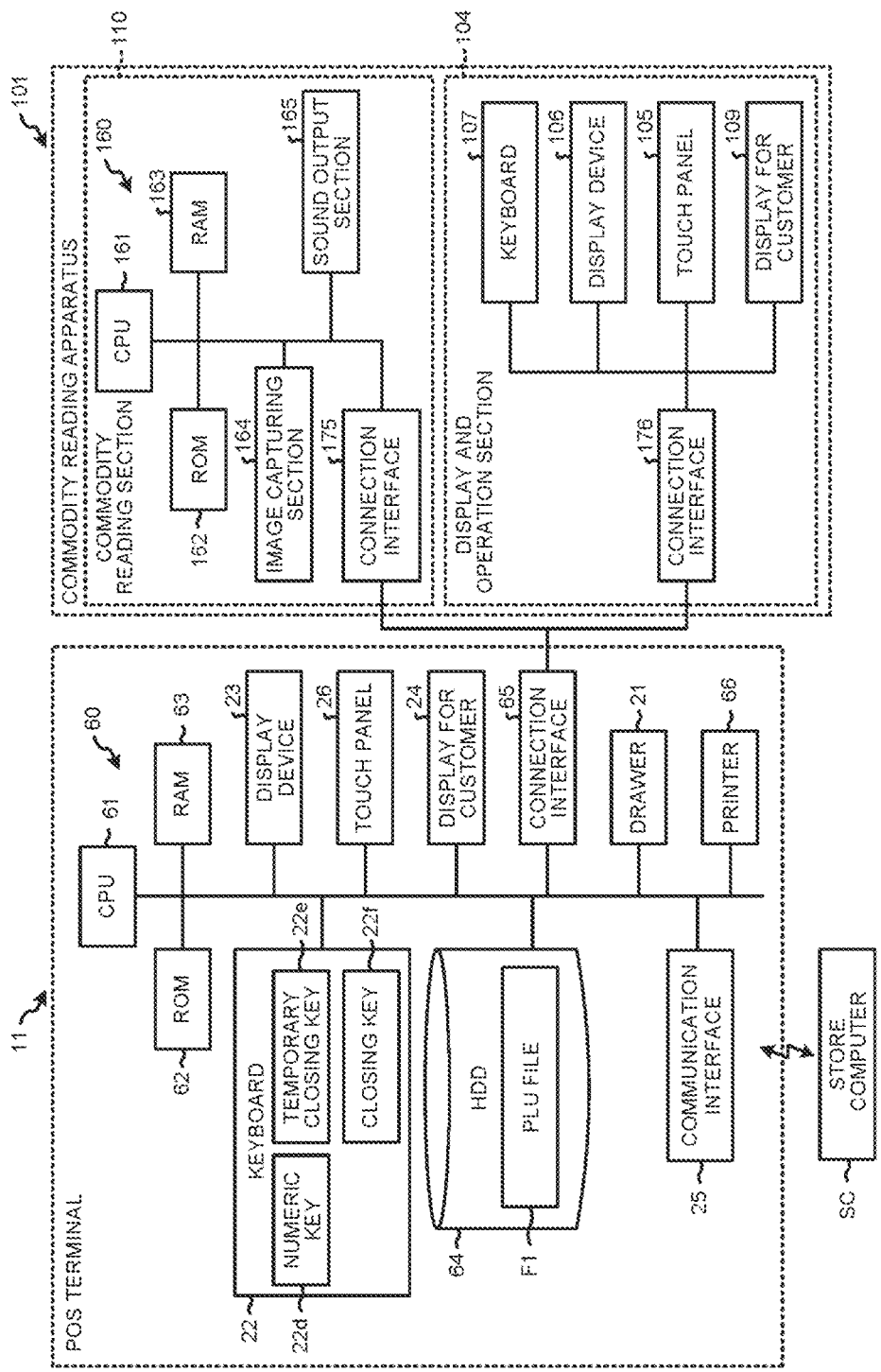
FIG. 2 is a block diagram illustrating hardware constitution of a POS terminal and a commodity reading apparatus shown in FIG. 1.

FIG. 2 is a block diagram illustrating the hardware constitution of the POS terminal 11 and the commodity reading apparatus 101.

The POS terminal 11 includes a microcomputer 60 serving as an information processing section for executing information processing. The microcomputer 60 comprises a CPU (Central Processing Unit) 61 which executes various arithmetic processing and controls each section, a ROM (Read Only Memory) 62 and a RAM (Random Access Memory) 63. The ROM 62 stores programs executed by the CPU 61.

The drawer 21, the keyboard 22, the display device 23, the display for customer 24, a communication interface 25, the touch panel 26, an HDD (Hard Disk Drive) 64, a connection interface 65 and a receipt printer 66 are all connected with the CPU 61 of the POS terminal 11 via various input/output circuits (not shown).

The keyboard 22 includes numeric keys 22d on which numeric characters such as '1', '2', '3' . . . and operators such as multiplying operator '*' are displayed, a temporary closing key 22e and a closing key 22f.

The HDD 64 stores various programs and files. When the POS terminal 11 is started, the programs stored in the HDD 64 are all or partially developed on the RAM 63 and executed by the CPU 61.

The HDD 64 also stores data files such as a PLU file F1 and the like. The PLU file F1 is readable from the commodity reading apparatus 101 via the connection interface 65.

The PLU file F1 is a data file in which a commodity G sold in the store is associated with information relating to the sales registration of the commodity G. FIG. 3 is a diagram schematically illustrating an example of the data arrangement of the PLU file F1. As shown in FIG. 3, a commodity ID uniquely assigned to each commodity G, information relating to a commodity such as a commodity category to which the commodity G belongs, a commodity name and a unit price, and a commodity image captured by photographing the commodity G, for each commodity are registered in association with one another in the PLU file F1. Further, in the PLU file F1, feature amount of a commodity (feature amount data of a standard commodity) is also registered (stored) in association with each commodity G in advance.

The commodity image is captured by photographing each standard commodity to be compared as a reference at the time of similarity degree determination described later. The commodity image (image of the standard commodity) is indicated as an image showing the commodity candidate at the time of indication of a commodity candidate described later. Further, the feature amount of a commodity G previously extracted from the captured image (for example, a commodity image) of each commodity G is registered in association with a corresponding commodity ID. The feature amount refers to the information representing the feature of the commodity G such as the hue, pattern, concave-convex state, shape and the like of the surface of a commodity G.

In the present embodiment, the feature amount of each commodity G is registered in the PLU file F1 in advance, however, it is not limited to this, and the feature amount may be not registered. In this case, the feature amount may be extracted from each commodity image by a feature amount extraction section 1614 described later to obtain the feature amount each time it is needed. Further, instead of a commodity image, an image for indication may also be registered. Hereinafter, each commodity registered in the PLU file F1 is referred to as a "registration commodity".

Returning to FIG. 2, the communication interface 25 for executing data communication with a store computer SC is connected with the CPU 61 of the POS terminal 11 through the input/output circuit (not shown). The store computer SC is arranged at a backyard and the like in a store. The HDD (not shown) of the store computer SC stores the PLU file F1 to be sent to the POS terminal 11, a stock management file for managing the stock of each registration commodity in the PLU file F1, and the like.

The connection interface 65 enables the data transmission/reception with the commodity reading apparatus 101. The commodity reading apparatus 101 is connected with the connection interface 65. The receipt printer 66 prints content of one transaction on a receipt under the control of the CPU 61.

The commodity reading apparatus 101 comprises a commodity reading section 110 and a display and operation section 104. The commodity reading section 110 includes a microcomputer 160. The microcomputer 160 comprises a CPU 161, a ROM 162 and a RAM 163. The ROM 162 stores programs executed by the CPU 161.

The image capturing section 164, a sound output section 165 and a connection interface 175 are connected with the CPU 161 through various input/output circuits (not shown). The operations of the image capturing section 164, the sound output section 165 and the connection interface 175 are controlled by the CPU 161.

The image capturing section 164, which is a color CCD sensor or a color CMOS sensor and the like, is an image capturing module for carrying out an image capturing processing through the reading window 103. For example, motion images are captured by the image capturing section 164 at 30 fps. The frame images (captured images) sequentially captured by the image capturing section 164 at a given frame rate are stored in the RAM 163. The sound output section 165 includes a sound circuit and a speaker and the like for issuing a preset alarm sound and the like. The sound output section 165 gives a notification through a sound such as an alarm sound under the control of the CPU 161.

The display and operation section 104 comprises the touch panel 105, the display device 106, the keyboard 107, the display for customer 109 and a connection interface 176. The connection interface 175 of the commodity reading section 110, which is connected with the connection interface 65 of the POS terminal 11, enables the data transmission/reception with the POS terminal 11. The connection interface 175 connects with the display and operation section 104 through the connection interface 176, and the CPU 161 carries out data transmission/reception between the commodity reading section 110 and the display and operation section 104 through the connection interface 175.

Next, the functional components of the CPU 161 and the CPU 61 realized by executing the programs by the CPU 161 and the CPU 61 are described below with reference to FIG. 4.

Figure 4:
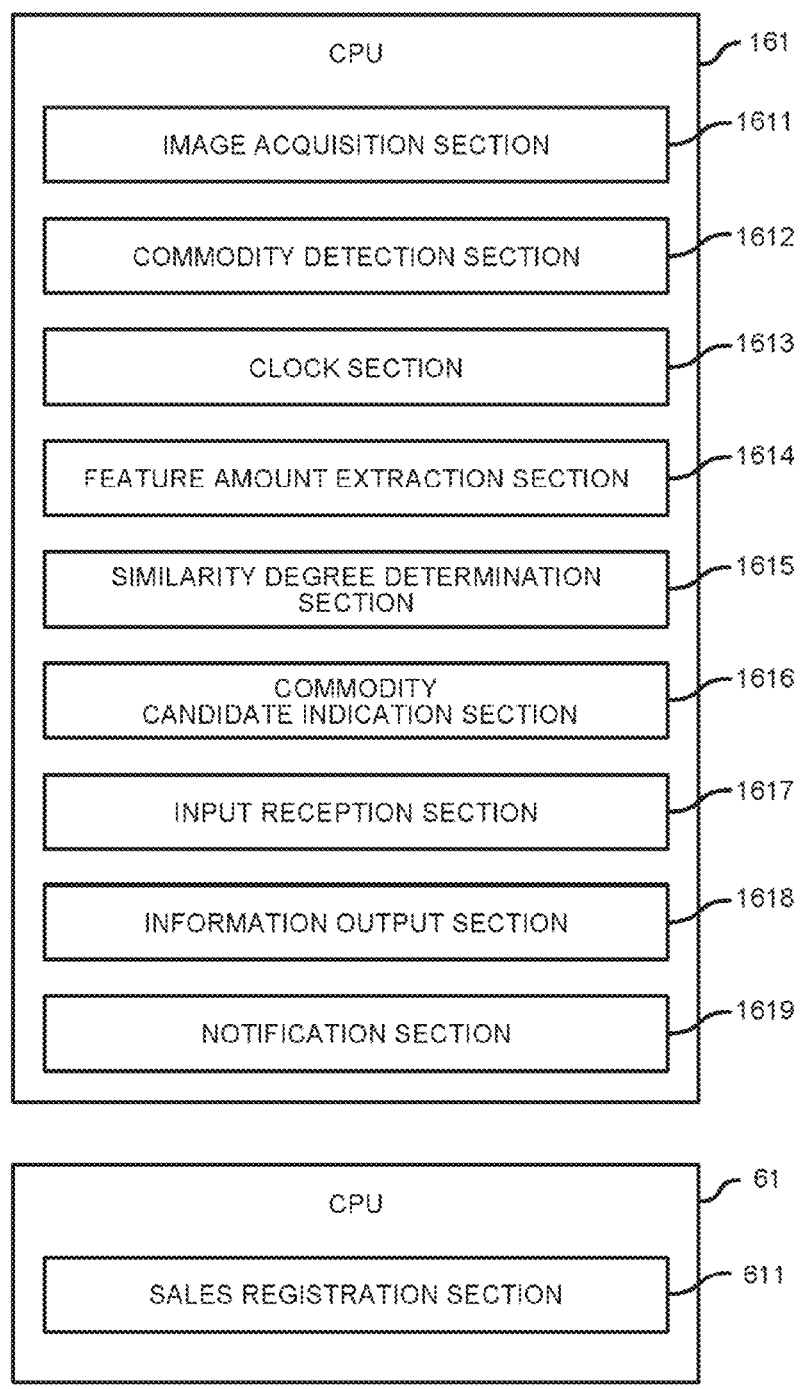
FIG. 4 is a block diagram illustrating functional components of the POS terminal and the commodity reading apparatus shown in FIG. 1.

FIG. 4 is a block diagram illustrating the functional components of the POS terminal 11 and the commodity reading apparatus 101. As shown in FIG. 4, the CPU 161 of the commodity reading apparatus 101 executes programs sequentially to function as an image acquisition section 1611, a commodity detection section 1612, a clock section 1613, a feature amount extraction section 1614, a similarity degree determination section 1615, a commodity candidate indication section 1616, an input reception section 1617, an information output section 1618 and a notification section 1619.

The image acquisition section 1611 is a functional section corresponding to an acquisition module. The image acquisition section 1611 outputs an ON-signal of image capturing to the image capturing section 164 to enable the image capturing section 164 to start an image capturing operation. The image acquisition section 1611 sequentially acquires the captured images which are captured by the image capturing section 164 after the image capturing operation is started and are stored in the RAM 163. The image acquisition section 1611 acquires the captured images from the RAM 163 in the order of storing them to the RAM 163.

The commodity detection section 1612 is a functional section corresponding to a detection module. The commodity detection section 1612 detects the whole or part of the contour line of a commodity G contained in the captured image acquired by the image acquisition section 1611, using a known pattern matching technology. Next, by comparing the contour line extracted from the last time captured image (frame image) with the contour line extracted from the current frame image (next to the last time), a different part, that is, a reflection image area of a commodity G directed to the reading window 103 is detected.

As another method for detecting a commodity G, it is determined whether or not a flesh color area is detected from the captured image. If the flesh color area is detected, that is, the reflection image of the hand of a shop clerk is detected, the detection of the aforementioned contour line nearby the flesh color area is carried out to try to extract the contour line of the commodity G that is assumed to be held by the shop clerk. At this time, if a contour line representing the shape of a hand and the contour line of another object nearby the contour line of the hand are detected, the commodity G is detected from the contour line of the object.

The clock section 1613 is a functional section corresponding to a clock module. The clock section 1613 keeps time, using a clock device such as an RTC (Real Time Clock) and the like. The clock section 1613 starts the count of time by a timer at the timing at which the commodity detection section 1612 detects the commodity G, and continues the count operation as long as the detection state continues. On the other hand, the clock section 1613 stops (resets) the count of time by the timer at the timing at which the commodity candidate described later is recognized by the similarity degree determination section 1615 or the detection of the commodity G based on the commodity detection section 1612 is released.

The feature amount extraction section 1614 is a functional section corresponding to an extraction module. The feature amount extraction section 1614 extracts, as a feature amount, the surface state (surface hue, pattern, concave-convex state, shape and the like) of the commodity G detected by the commodity detection section 1612 from the captured image acquired by the image acquisition section 1611.

The similarity degree determination section 1615 is a functional section corresponding to a calculation module and a recognition module. The similarity degree determination section 1615 compares the feature amount of each registration commodity registered in the PLU file F1 of the POS terminal 11 with the feature amount extracted by the feature amount extraction section 1614 to calculate the similarity degree therebetween. Further, the similarity degree determination section 1615 recognizes, in the registration commodities the similarity degrees of which are calculated, the registration commodity (commodity ID) of which the similarity degree is greater than a given threshold value as a candidate of the commodity G photographed by the image capturing section 164.

The similarity degree may be a value (similarity degree), which is obtained by comparing the feature amount of the commodity G with the standard feature amount of each commodity registered in the PLU file F1, indicating how much similar the two feature amounts are. The concept of the similarity degree is not limited to the example above. The similarity degree may be a value indicating the degree of coincidence with the feature amount of each registration commodity registered in the PLU file F1, or a value indicating the degree of correlation between the feature amount of the commodity G and the feature amount of each registration commodity registered in the PLU file F1.

The recognition of an object contained in an image as stated above is referred to as a general object recognition. As to the general object recognition, various recognition technologies are described in the following document.

Keiji Yanai "Present situation and future of generic object recognition", Journal of Information Processing Society, Vol. 48, No. SIG16 [Search on Heisei 25 January 24], Internet <URL: http://mm.cs.uec.ac.jp/IPSJ-TCVIM-Yanai.pdf>

In addition, the technology carrying out the general object recognition by performing an area-division on the image for each object is described in the following document.

Jamie Shotton etc, "Semantic Texton Forests for Image Categorization and Segmentation", [Search on Heisei 25 January 24], Internet <URL: http://cite/seerx.ist.psu.edu/viewdoc/download?doi=10.1.1.145.3036&rep=rep1&type=pdf>

It is noted that no limitation is given to the method for calculating the similarity degree. For example, the similarity degree can be calculated as an absolute evaluation or a relative evaluation. If the similarity degree is calculated as an absolute evaluation, the captured image of the commodity G and each of the registered commodities are compared one by one, and the similarity degree obtained from the comparison result can be adopted as it is. If the similarity degree is calculated as a relative evaluation, the similarity degree is obtained as long as the sum of the similarity degrees between the captured commodity G and each registration commodity becomes 1.0 (100%).

The commodity candidate indication section 1616 displays information relating to the registration commodity recognized as a candidate by the similarity degree determination section 1615 on the display device 106. More specifically, the commodity candidate indication section 1616 reads the record of the registration commodity recognized as a commodity candidate from the PLU file F1, and displays it on the commodity candidate screen of the display device 106.

Figure 5:
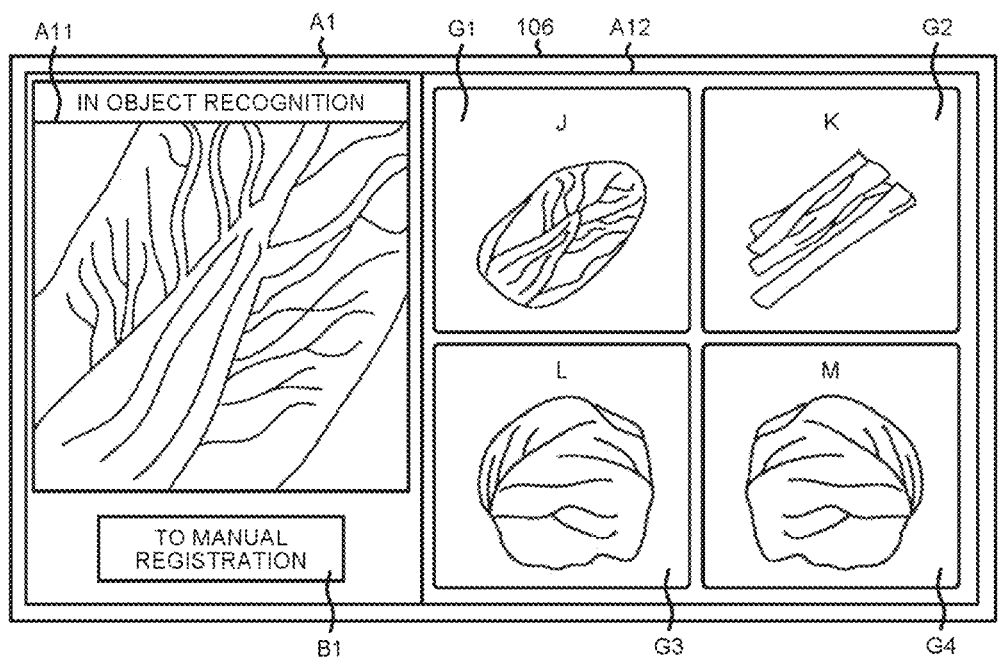
FIG. 5 is a diagram illustrating an example of the display of a commodity candidate screen.

FIG. 5 is a diagram illustrating an example of the display of a commodity candidate indication screen. As shown in FIG. 5, a commodity candidate indication screen A1 includes a captured image area A11 and a commodity candidate indication area A12.

The captured image area A11 is used for displaying the captured image acquired by the image acquisition section 1611. The commodity candidate indication area A12 is used for displaying the commodity image of each commodity recognized as a candidate. The commodity images (G1~G4) as well as the commodity names and the like of the registration commodities are displayed in the commodity candidate indication area A12 in the descending order of similarity degree. The commodity images displayed in the commodity candidate indication area A12 can be selected through a touch operation on the touch panel 105. In addition, the commodity image is not displayed in the commodity candidate indication area A12 until the commodity is recognized. It is also applicable to display only the commodity names of the commodity candidates recognized by the similarity degree determination section 1615 in the commodity candidate indication area A12 without displaying the commodity images.

A manual registration button B1 is provided at an area below the captured image area A11 to instruct the commodity recognition (registration) which is carried out by manually designating a category code or a commodity list. The CPU 161 displays on the display device 106 a manual registration screen (not shown) which is used to manually carry out the recognition (registration) of a commodity in response to the operation of the manual registration button B1. The commodity designated through the manual registration screen is processed as a determined commodity described later.

Returning to FIG. 4, the input reception section 1617 receives various input operations corresponding to the display of the display device 106 through the touch panel 105 or the keyboard 107. For example, the input reception section 1617 receives a selection operation of one commodity candidate from the commodity candidates displayed on the display device 106. The input reception section 1617 receives the selected commodity candidate as the commodity (determined commodity) corresponding to the commodity G photographed by the image capturing section 164. In a case in which the commodity detection section 1612 has a capability of detecting a plurality of commodities G, the input reception section 1617 may receive selection operations of a plurality of commodity candidates from the commodity candidates.

The information output section 1618 outputs information (for example, the commodity ID, the commodity name and the like) indicating the commodity determined in the aforementioned manner to the POS terminal 11 through the connection interface 175.

The information output section 1618 may also output the sales volume input separately through the touch panel 105 or the keyboard 107 to the POS terminal 11 together with the commodity ID and the like. As to information output to the POS terminal 11 by the information output section 1618, the information output section 1618 may directly notify of the commodity ID read from the PLU file F1, or the commodity name or the file name of the commodity image capable of specifying the commodity ID may be notified, or the storage location of the commodity ID (storage address in the PLU file F1) may also be notified.

The notification section 1619 is a functional section corresponding to a notification module. The notification section 1619 gives a notification to a user according to the count value (elapsed time) of the timer in the clock section 1613. More specifically, the notification section 1619 displays a first notification information urging the operator to change the image capturing condition on the display device 106 if the count value of the timer reaches a first given time (for example, three seconds).

Figure 6:
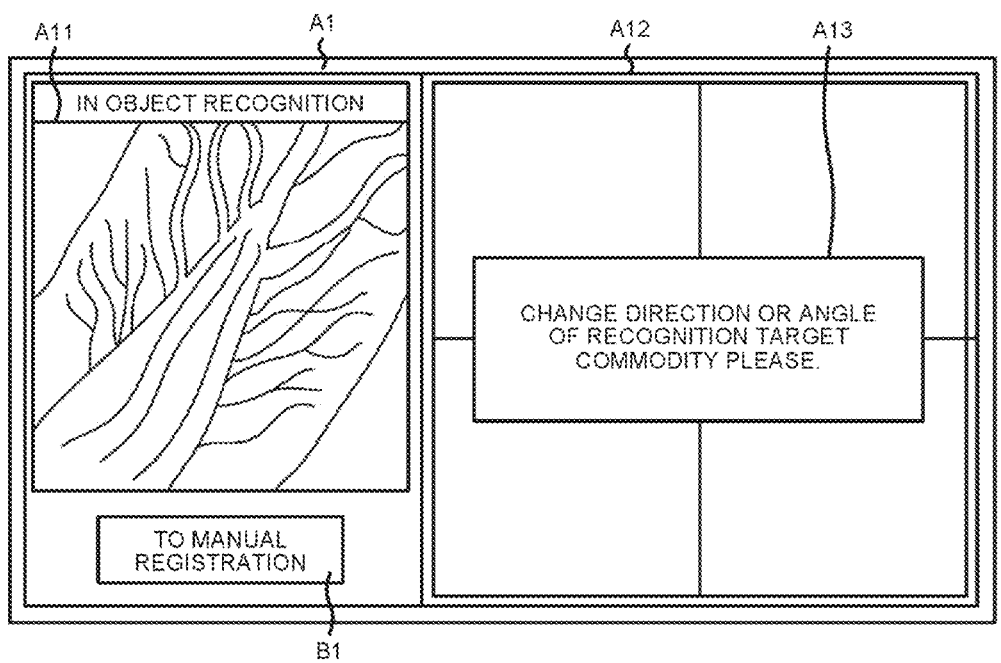
FIG. 6 is a diagram illustrating an example of the display of a first notification information.

FIG. 6 is a diagram illustrating an example of the display of the first notification information. As shown in FIG. 6, the first notification information A13 is displayed over the commodity candidate indication screen A1. The first notification information A13 contains a message and the like for urging the operator to change, for example, the photographing direction or the photographing angle of the commodity G as information for urging the operator to change the photographing condition. The operator of the commodity reading apparatus 101 changes the direction or the angle of the commodity G to the reading window 103 according to the first notification information A13 displayed on the display device 106. In this way, the photographing condition of the commodity G is changed, thus, there is a possibility that the extracted feature amount is improved to a proper value.

Further, the notification section 1619 displays the second notification information for urging the operator to use other recognition method on the display device 106 if the count value of the timer reaches a second given time (for example, six seconds) greater (longer) than the first given time.

Figure 7:
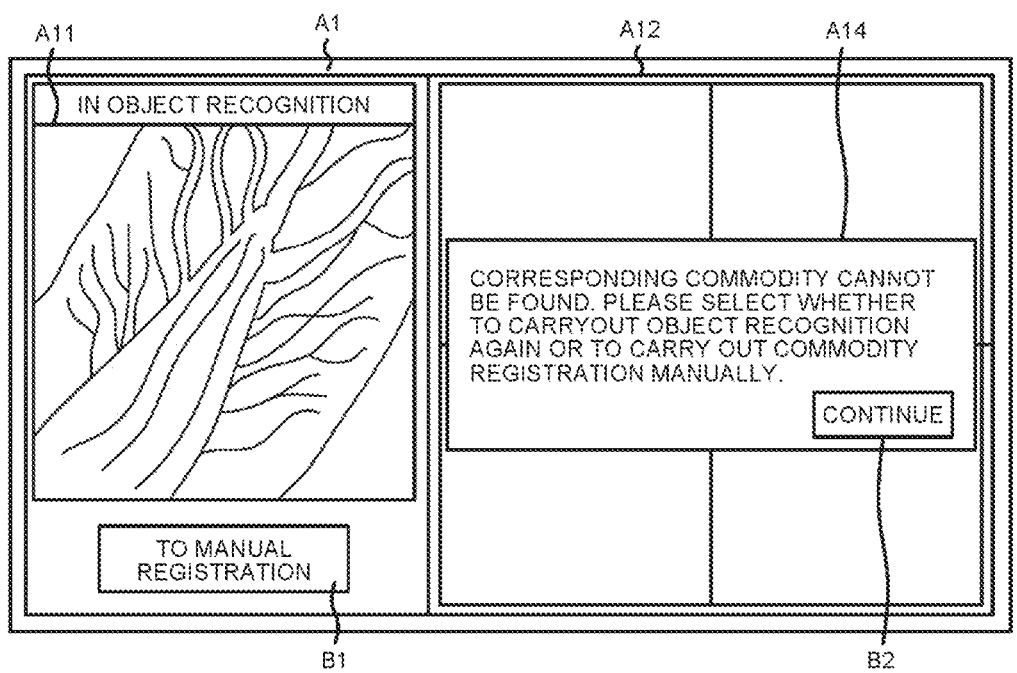
FIG. 7 is a diagram illustrating an example of the display of a second notification information.

FIG. 7 is a diagram illustrating an example of the display of a second notification information. As shown in FIG. 7, the second notification information A14 is displayed over the commodity candidate indication screen A1 in an overlapping manner. The second notification information A14 contains a message for notifying the operator, for example, that the commodity cannot be found. The second notification information A14 further contains a message for asking the operator to select whether the recognition (object recognition) by the similarity degree determination section 1615 is re-tried or the recognition (category registration and the like) is executed manually. The display of the second notification information A14 further contains a continue button B2 for instructing continue of the recognition by the similarity degree determination section 1615 by the operator.

Thus, the operator of the commodity reading apparatus 101 selects continue of the recognition by the similarity degree determination section 1615 or recognition by the manual operation by operating the continue button B2 or the manual registration button B1.

If the operation of the continue button B2 is received, the CPU 161 of the commodity reading apparatus 101 erases the second notification information A14 and continues the registration processing by the similarity degree determination section 1615. At this time, at the timing at which the continue button B2 is operated, the timer of the clock section 1613 may be reset.

If the manual registration button B1 is operated, the CPU 161 stops the image acquisition by the image acquisition section 1611 and displays the manual registration screen (not shown) on the display device 106. Then, if a commodity (registration commodity) is recognized based on the category code and the like designated through the manual registration screen, the CPU 161 sets the recognized registration commodity as the determined commodity.

On the other hand, the CPU 61 of the POS terminal 11 has a function of a sales registration section 611 by executing programs. The sales registration section 611 carries out the sales registration of a corresponding commodity based on the commodity ID and the sales volume output from the information output section 1618 of the commodity reading apparatus 101. Specifically, the sales registration section 611 carries out, with reference to the PLU file F1, the sales registration by recording the notified commodity ID and the commodity category, commodity name and unit price specified with the commodity ID in a sales master file together with the sales volume.

Figure 8:
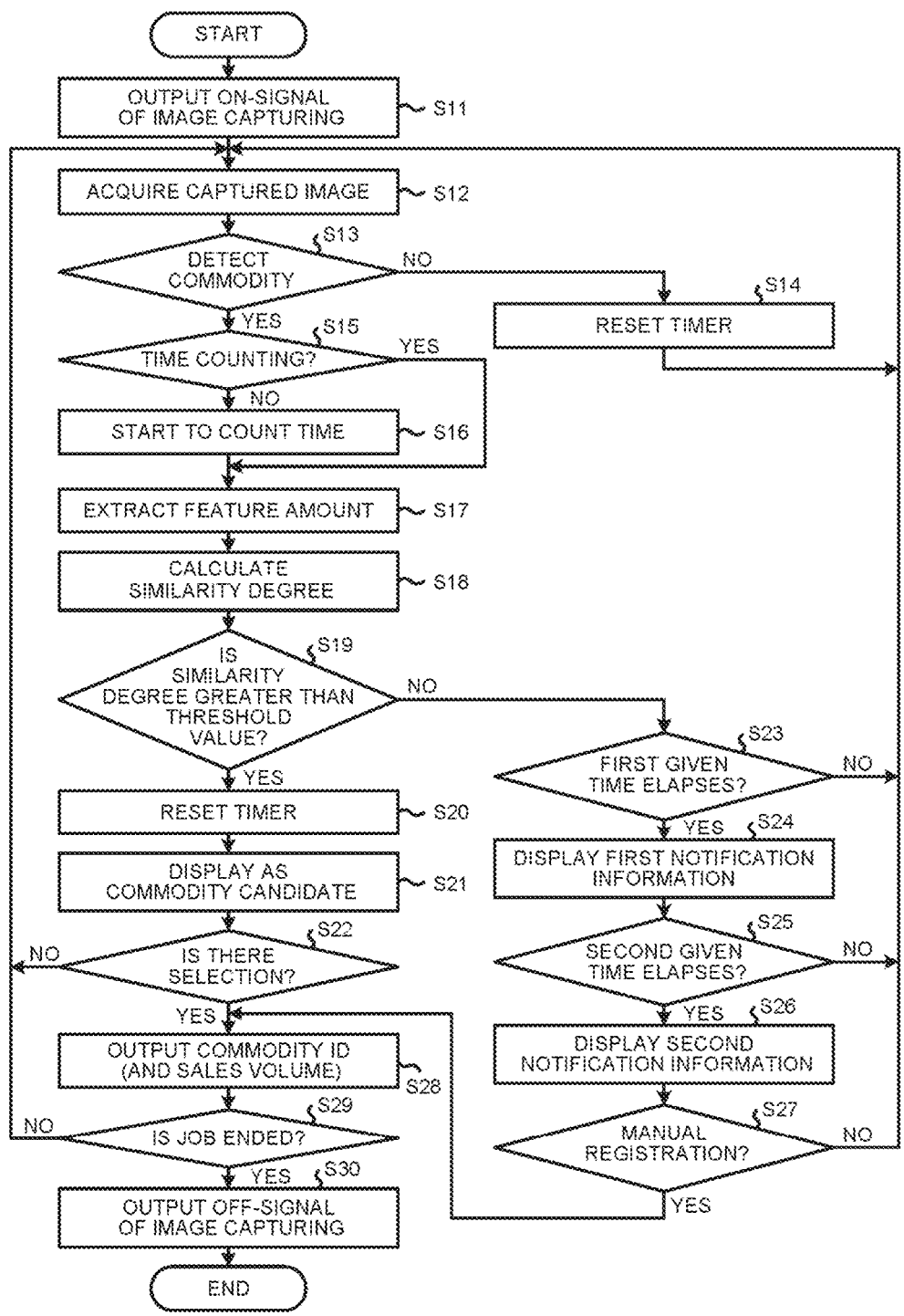
FIG. 8 is a flowchart illustrating a procedure of a commodity recognition processing executed by the commodity reading apparatus.

Hereinafter, the operations of the checkout system 1 are described. First, the operations of the commodity reading apparatus 101 are described with reference to FIG. 8. FIG. 8 is a flowchart illustrating the procedure of the commodity recognition processing executed by the commodity reading apparatus 101.

When the processing is started in response to the start of the commodity registration by the POS terminal 11, the image acquisition section 1611 outputs an ON-signal of image capturing to the image capturing section 164 to enable the image capturing section 164 to start an image capturing operation (ACT S11).

The image acquisition section 1611 acquires a frame image (captured image) that is captured by the image capturing section 164 and is stored in the RAM 163 (ACT S12). Next, the commodity detection section 1612 detects the whole or part of the commodity G from the captured image acquired in ACT S12 (ACT S13). If the commodity G is not detected (NO in ACT S13), the clock section 1613 resets the timer (ACT S14), and then ACT S12 is executed.

If the commodity G is detected in ACT 13 (YES in ACT S13), the clock section 1613 determines whether or not the timer is counting (ACT S15). If the timer is not counting (NO in ACT S15), the clock section 1613 starts the counting (ACT S16), and then ACT S17 is taken. If the timer is counting (YES in ACT S15), the operation proceeds to ACT S17 directly.

Next, the feature amount extraction section 1614 extracts the feature amount of the commodity G detected in ACT S13 from the captured image acquired in ACT S12 (ACT S17). The similarity degree determination section 1615 compares the feature amount extracted in ACT S17 with the feature amount of each registration commodity registered in the PLU file F1 to calculate similarity degrees respectively (ACT S18). Then, the similarity degree determination section 1615 determines whether or not there is a registration commodity of which the similarity degree is greater than a given threshold value (ACT S19) in the registration commodities the similarity degrees of which are calculated in ACT S18.

In ACT S19, if it is determined that there is a registration commodity of which the similarity degree is greater than the threshold value (YES in ACT S19), the clock section 1613 resets the timer (ACT S20). Then, the commodity candidate indication section 1616 reads the record of the registration commodity (commodity candidate) of which the similarity degree is greater than the threshold value from the PLU file F1, and displays it on the display device 106 (ACT S21).

Next, the input reception section 1617 determines whether or not the selection of the commodity candidate is received through the touch panel 105 or the keyboard 107 (ACT S22). If the selection operation is received (YES in ACT S22), the input reception section 1617 sets the selected commodity candidate as a determined commodity, and then ACT S28 is taken. Further, in ACT S22, if no selection of the commodity candidate is received (NO in ACT S22), ACT S12 is taken.

On the other hand, in ACT S19, if it is determined that there is no registration commodity of which the similarity degree is greater than the threshold value (NO in ACT S19), the notification section 1619 gives a notification according to the counted time value of the timer. Specifically, the notification section 1619 determines whether or not the count value of the timer of the clock section 1613 is greater than the first given time (ACT S23). If the count value of the timer is greater than the first given time (YES in ACT S23), the notification section 1619 displays the first notification information on the display device 106 (ACT S24), and then ACT S25 is taken. If the count value of the timer is not greater than the first given time (NO in ACT S23), ACT S12 is taken.

Next, the notification section 1619 determines whether or not the count value of the timer of the clock section 1613 is greater than the second given time (ACT S25). If the count value of the timer is greater than the second given time (YES in ACT S25), the notification section 1619 displays the second notification information on the display device 106 (ACT S26), and then ACT S27 is taken. If the count value of the timer is not greater than the second given time (NO in ACT S25), ACT S12 is taken.

Sequentially, the input reception section 1617 waits for until an operation for instructing the recognition by the similarity degree determination section 1615 or the recognition by the manual operation is carried out through the touch panel 105 or the keyboard 107 (ACT S27). If the operation for instructing continue of the recognition by the similarity degree determination section 1615 is received (NO in ACT S27), ACT S12 is taken again to continue the recognition by the similarity degree determination section 1615. In this case, the counting of the timer in the clock section 1613 may be invalidated.

In ACT S27, if the operation for instructing recognition by manual operation is received (YES in ACT S27), the CPU 161 displays the manual registration screen. Then, the CPU 161 sets the commodity (registration commodity) designated through the manual registration screen as a determined commodity, and then ACT S28 is taken.

The information output section 1618 outputs information such as the commodity ID of the registration commodity corresponding to the set determined commodity to the POS terminal 11 (ACT S28), and then ACT S29 is taken.

In a case in which the sales volume is input separately through the touch panel 105 or the keyboard 107, the sales volume is also output to the POS terminal 11 together with the information representing the determined commodity in ACT S28. If the sales volume is not input, the sales volume "1" may also be output as a default value.

In ACT S29, the CPU 161 determines whether or not the job is ended with a notification of the termination of the commodity registration from the POS terminal 11 (ACT S29). If the job is continued (NO in ACT S29), the CPU 161 returns to the processing in ACT S12 to continue the processing. If the job is ended (YES in ACT S29), the image acquisition section 1611 terminates the image capturing by the image capturing section 164 by outputting an OFF-signal of image capturing to the image capturing section 164 (ACT S30), then the commodity recognition processing is ended.

Figure 9:
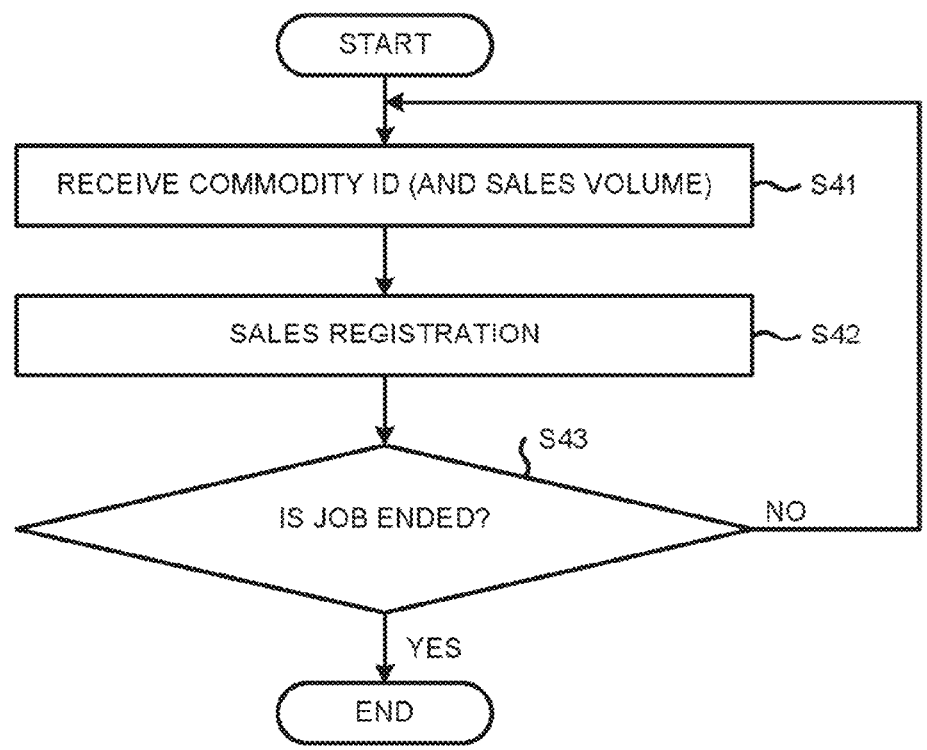
FIG. 9 is a flowchart illustrating a procedure of a sales registration processing executed by the POS terminal.

Next, the processing operations of the POS terminal 11 are described. FIG. 9 is a flowchart illustrating the procedure of the sales registration processing executed by the POS terminal 11.

First, when the processing is started in response to a start of the commodity registration according to an operation instruction through the keyboard 22, the CPU 61 receives the commodity ID and the sales volume of the determined commodity output by the commodity reading apparatus 101 in ACT S28 of FIG. 8 (ACT S41). Then, the sales registration section 611 reads the commodity category, the unit price and the like from the PLU file F1 based on the commodity ID and the sales volume received in ACT S41 and registers the sales of the commodity G read by the commodity reading apparatus 101 in the sales master file (ACT S42).

Then, the CPU 61 determines whether or not the job is ended due to the end of the sales registration according to the operation instruction through the keyboard 22 (ACT S43). If the job is continued (NO in ACT S43), the CPU 61 returns to ACT S41 to continue the processing. If the job is ended (YES in ACT S43), the CPU 61 terminates the sales registration processing.

As stated above, according to the present embodiment, a notification is given to the operator in a case in which the commodity candidate is not recognized even if a given time elapses from the moment the commodity G is detected from the captured image. In this way, for example, in a case in which there is no registration commodity corresponding to the commodity G, the operator can be notified of the message indicating that. Further, as it can be prevented that the operation of photographing the commodity G is accidentally continued, the recognition processing can be carried out efficiently.

In accordance with the present embodiment, the notification to the operator is carried out in two stages including the first notification information and the second notification information according to the count value of the timer in the clock section 1613. In this way, change of the photographing condition and change of the recognition method can be proposed to the operator in a step manner, and therefore, the operator can carry out the processing of recognizing the commodity G efficiently.

Further, instead of giving a notification to the operator in two stages (the first notification information and the second notification information) according to the count value of the timer in the clock section 1613, either of the first notification information or the second notification information may be notified according to the count value of the timer in the clock section 1613.

In the commodity recognition processing described above, the threshold value of the similarity degree determination is fixed, however, it is not limited to this. The threshold value may change according to the count value of the timer. For example, at the timing at which the count value of the timer of the clock section 1613 is greater than the first given time (YES in ACT S23), the similarity degree determination section 1615 may decrease the threshold value of the similarity degree determination by a given amount. If the count value of the timer of the clock section 1613 is greater than the second given time, and the operation for instructing continue of the recognition processing by the similarity degree determination section 1615 is received in ACT S27 (NO in ACT S27), the similarity degree determination section 1615 may decrease the threshold value of the similarity degree determination by a given amount.

In this way, degree of recognizing the commodity candidate can be improved, and thus, in a case in which there is a registration commodity corresponding to the commodity G, the recognition processing can be carried out efficiently. Though no specific limitation is given to the decrease amount of the threshold value, for example, the threshold value may be decreased by 10% of the original threshold value.

While certain embodiments have been described, these embodiments have been presented by way of example only, and are not intended to limit the scope of the invention. Indeed, the novel embodiments described herein may be embodied in a variety of other forms; furthermore, various omissions, substitutions, changes and additions in the form of the embodiments described herein may be made without departing from the spirit of the invention. The accompanying claims and their equivalents are intended to cover such forms or modifications as would fall within the scope and spirit of the invention.

For example, in the embodiment stated above, the POS terminal 11 is arranged to include the PLU file F1, however, it is not limited to this, and all or part of the PLU file F1 may be included in the commodity reading apparatus 101.

Further, it is arranged in the embodiment stated above that the recognition of the commodity candidate is carried out in the commodity reading apparatus 101, however, all or part of the functional sections of the commodity reading apparatus 101 may be included in the POS terminal 11.

For example, the POS terminal 11 may comprise the clock section 1613, the feature amount extraction section 1614 and the similarity degree determination section 1615, while the commodity reading apparatus 101 may comprise the image acquisition section 1611, the commodity detection section 1612, the commodity candidate indication section 1616, the input reception section 1617 and the information output section 1618. In this case, the commodity reading apparatus 101 transmits the captured image, which is acquired by the image acquisition section 1611 and from which the commodity is detected by the commodity detection section 1612, to the POS terminal 11. The POS terminal 11 starts the count of time by the clock section 1613 at the timing at which the captured image is received to count the elapsed time until the similarity degree determination section 1615 recognizes the commodity candidate. Then the commodity reading apparatus 101 receives the commodity candidate (commodity ID) recognized by the POS terminal 11, and indicates the commodity candidate on the display device 106 through the commodity candidate indication section 1616. Further, in a case in which the POS terminal 11 comprises all the functional sections of the commodity reading apparatus 101, the commodity reading apparatus 101 functions as an image capturing apparatus, and the POS terminal 11 carries out the commodity candidate recognition based on the captured image sent from the commodity reading apparatus 101.

In the embodiment stated above, a stationary type scanner apparatus (commodity reading apparatus 101) is used, as an example, however, it is not limited to this, and a so-called handy type scanner device connected with the POS terminal 11 may be employed.

Further, according to the embodiment stated above, in a checkout system 1 consisting of the POS terminal 11 and the commodity reading apparatus 101, the present invention is applied to the commodity reading apparatus 101, however, it is not limited to this, and it may also be applied to a single apparatus comprising all the functions of the POS terminal 11 and the commodity reading apparatus 101, or a checkout system constituted by, for example, connecting the commodity reading apparatus 101 and the POS terminal 11 shown in FIG. 1 in a wired or wireless manner. As an apparatus comprising all the functions of the POS terminal 11 and the commodity reading apparatus 101, a self-checkout apparatus (hereinafter referred to as a self-checkout POS) arranged and used in a store such as a supermarket and the like is known.

Figure 10:
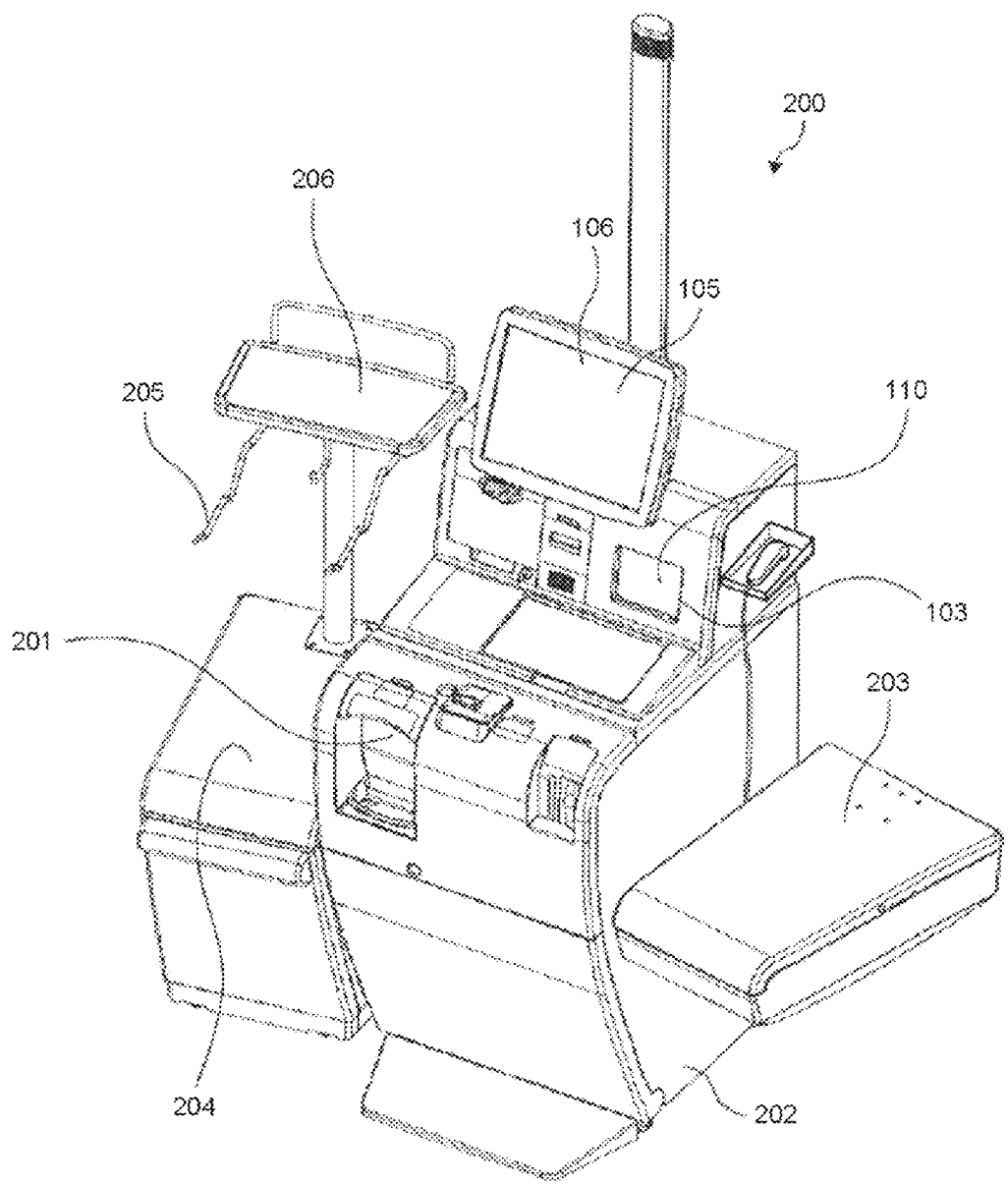
FIG. 10 is a perspective view illustrating the constitution of a self-checkout POS terminal according to the embodiment.
Figure 11:
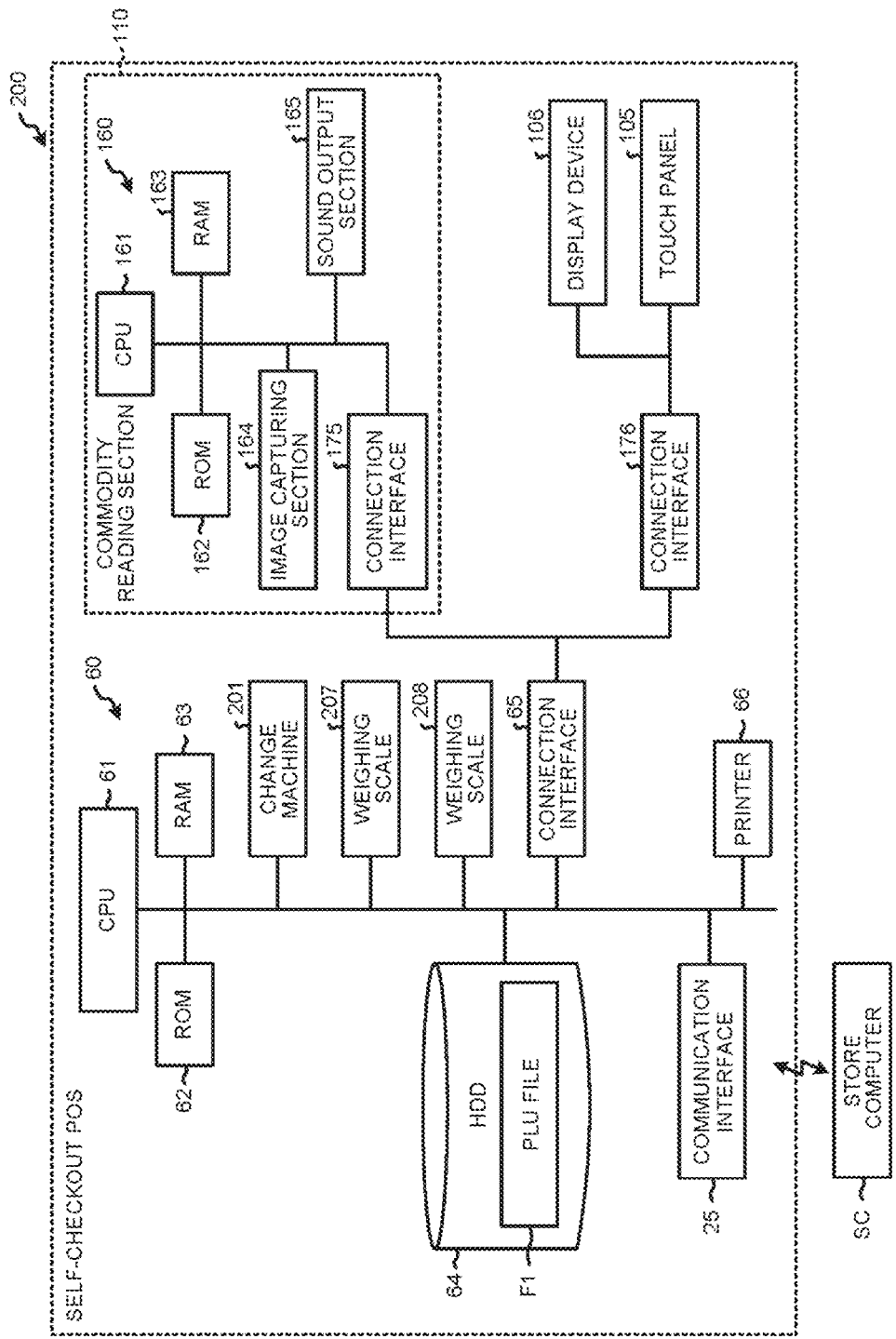
FIG. 11 is a block diagram illustrating hardware constitution of the self-checkout POS terminal shown in FIG. 10.

FIG. 10 is a perspective view illustrating the external constitution of the self-checkout POS 200, and FIG. 11 is a block diagram illustrating the hardware constitution of the self-checkout POS 200. Hereinafter, the same numerals are applied to the components similar to that in FIG. 1 and FIG. 2, and therefore the detailed descriptions thereof are not repeated.

As shown in FIG. 10 and FIG. 11, a main body 202 of the self-checkout POS 200 comprises a display device 106 having a touch panel 105 on the surface thereof and a commodity reading section 110 which captures a commodity image to recognize (detect) the category of the commodity.

The display device 106 may be, for example, a liquid crystal display. The display device 106 displays a guidance screen for providing customers a guidance for the operation of the self-checkout POS 200, various input screens, a registration screen for displaying the commodity information captured by the commodity reading section 110 and a settlement screen on which a total amount, a deposit amount and a change amount are displayed for selecting a payment method.

The commodity reading section 110 captures a commodity image through the image capturing section 164 when the customer holds the code symbol attached to a commodity to the reading window 103 of the commodity reading section 110.

Further, a commodity placing table 203 for placing the unsettled commodity in a shopping basket is provided at the right side of the main body 202, and, at the left side of the main body 202, a commodity placing table 204 for placing the settled commodity is provided. A bag hook 205 for hooking a bag for placing the settled commodities therein and a temporary placing table 206 for placing the settled commodities temporarily before the settled commodities are put into a bag are also provided at the left side of the main body 202. The commodity placing tables 203 and 204 are equipped with weighing scales 207 and 208 respectively, and are therefore capable of confirming whether or not the weight of commodities is the same before and after a settlement.

Further, a change machine 201 for receiving bill for settlement and discharging bill as change is arranged in the main body 202 of the self-checkout POS 200.

In a case in which the present invention is applied to the self-checkout POS 200 having such constitutions as described above, the self-checkout POS 200 functions as an information processing apparatus. Further, a single apparatus comprising the functions of the POS terminal 11 and the commodity reading apparatus 101 is not limited to the self-checkout POS 200 having the above-constitutions and it may be an apparatus without having weighing scales 207 and 208.

Further, in the embodiment above, the programs executed by each apparatus are pre-incorporated in the storage medium (ROM or storage section) of each apparatus, however, the present invention is not limited to this, the programs may be recorded in a computer-readable recording medium such as CD-ROM, flexible disk (FD), CD-R, DVD (Digital Versatile Disk) in the form of installable or executable file. Further, the storage medium, which is not limited to a medium independent from a computer or an incorporated system, further includes a storage medium for storing or temporarily storing the downloaded program transferred via a LAN or the Internet.

In addition, the programs executed by each apparatus described in the embodiments above may be stored in a computer connected with a network such as the Internet to be provided through a network download or distributed via a network such as the Internet.

Alternatively, the programs mentioned in the embodiments above may be incorporated in a portable information terminal such as a mobile phone having a communication function, a smart phone, a PDA (Personal Digital Assistant) and the like to realize the functions of the programs.

What is claimed is:

1. An information processing apparatus, comprising:
   a memory having computer executable components stored therein; and
   a hardware processor communicatively coupled to the memory, the hardware processor configured to:
   photograph a commodity to capture an image of the commodity;
   acquire the captured image;
   recognize a commodity as a candidate of the commodity from standard commodities based on the acquired image of the commodity;
   count an elapsed time until the commodity is recognized; and
   provide a first notification for urging a user to change a current recognition method to another recognition method if the elapsed time reaches a first predetermined time, wherein the hardware processor is further configured to:
   detect an image of the commodity from the image captured,
   extract a feature amount from the image of the commodity detected,
   compare the feature amount of each standard commodity with the feature amount of the extracted commodity to calculate a similarity degree therebetween,
   recognize a standard commodity of which the similarity degree is greater than a threshold value as the commodity candidate, and
   count the elapsed time from a time at which the image of the commodity is detected to a time at which the commodity candidate is recognized.

2. The information processing apparatus according to claim 1, wherein
   the hardware processor is further configured to provide a second notification for urging the user to change a current image photographing condition if the elapsed time reaches a second predetermined time.

3. The information processing apparatus according to claim 1, wherein the hardware processor is further configured to decrease the threshold value by a given amount if the elapsed time reaches the first predetermined time.

4. An information processing method, including:
   photographing a commodity to capture image of the commodity;
   acquiring the image captured;
   recognizing a commodity as a candidate of the commodity from standard commodities based on the image of the commodity captured;
   counting an elapsed time until the commodity is recognized; and
   giving a notification for urging a user to change a current recognition method to another recognition method if the elapsed time reaches a given time, wherein a hardware, processor is further configured to:
detect an image of the commodity from the image captured,
extract a feature amount from the image of the commodity detected,
compare the feature amount of each standard commodity with the feature amount of the extracted commodity to calculate a similarity degree therebetween,
recognize a standard commodity of which the similarity degree is greater than a threshold value as the commodity candidate,
count the elapsed time from a time at which the image of the commodity is detected to a time at which the commodity candidate is recognized.

5. An information processing method, including:
acquiring an image captured by photographing a commodity;
recognizing a commodity as a candidate of the commodity from standard commodities based on the image of the commodity captured;
counting an elapsed time until the commodity is recognized; and
giving a notification for urging a user to change a current recognition method to another recognition method if the elapsed time reaches a given time, wherein a hardware processor is further configured to:
detect an image of the commodity from the image captured,
extract a feature amount from the image of the commodity detected,
compare the feature amount of each standard commodity with the feature amount of the extracted commodity to calculate a similarity degree therebetween,
recognize a standard commodity of which the similarity degree is greater than a threshold value as the commodity candidate, and
count the elapsed time from a time at which the image of the commodity is detected to a time at which the commodity candidate is recognized.

* * * * *